United States Patent [19]

Crosetto

[11] Patent Number: 5,590,284
[45] Date of Patent: Dec. 31, 1996

[54] PARALLEL PROCESSING DATA NETWORK OF MASTER AND SLAVE TRANSPUTERS CONTROLLED BY A SERIAL CONTROL NETWORK

[75] Inventor: Dario B. Crosetto, DeSoto, Tex.

[73] Assignee: Universities Research Association, Inc., Washington, D.C.

[21] Appl. No.: 312,435

[22] Filed: Sep. 26, 1994

Related U.S. Application Data

[63] Continuation of Ser. No. 856,622, Mar. 24, 1992, abandoned.

[51] Int. Cl.⁶ .................................................. G06F 15/16
[52] U.S. Cl. ........................... 395/200.05; 395/200.12; 395/308; 395/311; 395/312; 395/800
[58] Field of Search ................... 395/200.05, 200.12, 395/200.2, 306, 308, 311, 312, 800; 341/51; 340/825.79; 300/53, 67, 85.9

[56] References Cited

U.S. PATENT DOCUMENTS

| | | | |
|---|---|---|---|
| 4,320,452 | 3/1982 | Kempf et al. | 395/325 |
| 4,355,354 | 10/1982 | Kempf et al. | 395/325 |
| 4,514,807 | 4/1985 | Nogi | 364/200 |
| 4,591,976 | 5/1986 | Webber et al. | 395/182.18 |
| 4,610,013 | 9/1986 | Long et al. | 371/9 |
| 4,641,238 | 2/1987 | Kneib | 364/200 |
| 4,752,777 | 6/1988 | Franaszek | 340/825.79 |
| 4,800,441 | 1/1989 | Sato | 358/261.1 |
| 4,811,210 | 3/1989 | McAulay | 395/312 |
| 4,811,361 | 3/1989 | Bacou et al. | 375/25 |
| 4,816,993 | 5/1989 | Takahashi et al. | 395/250 |
| 4,858,177 | 8/1989 | Smith | 364/900 |
| 4,876,641 | 10/1989 | Cowley | 364/200 |
| 4,891,751 | 1/1990 | Call et al. | 364/200 |
| 4,912,704 | 3/1990 | Bonicioli et al. | 370/85.1 |

(List continued on next page.)

FOREIGN PATENT DOCUMENTS

| | | |
|---|---|---|
| 0333537 | 2/1989 | France . |
| 82/02965 | 2/1982 | WIPO . |

OTHER PUBLICATIONS

Inmos, "The Transputer Family" (Jun. 1986) pp. 32–33.
William Stallings, "Data and Computer Communications" Fig. 1–5 (2d ed. 1988).
Martin J. Weik, "Communications Standard Dictionary" p. 1076 (2d ed. 1989).
Charles Carinalli & John Blair, 'National's Advanced Graphics Chip Set for High-Performance Graphics' published in IEEE Computer Graphics and Applications, vol. 6, No. 10, Oct. 1986, New York, US pp. 40–48, XP2230.
"Scalable Coherent Interface", Jan. 1990, Authors: Knug Alnaes & Ernst H. Kristiansen—Dolphin Server Technology A.S.—Oslo, Norway; David B. Gustavson—Stanford Linear Accelerator Center—Stanford, California; David V. James—Apple Computer—Cupertino, California.
"Direct Memory Access Controller", Motorola Semiconductor Technical Data.

*Primary Examiner*—Lance Leonard Barry
*Attorney, Agent, or Firm*—Elizabeth A. Mark, Esq.

[57] ABSTRACT

The present device provides for a dynamically configurable communication network having a multi-processor parallel processing system having a serial communication network and a high speed parallel communication network. The serial communication network is used to disseminate commands from a master processor (100) to a plurality of slave processors (200) to effect communication protocol, to control transmission of high density data among nodes and to monitor each slave processor's status. The high speed parallel processing network is used to effect the transmission of high density data among nodes in the parallel processing system. Each node comprises a transputer (104), a digital signal processor (114), a parallel transfer controller (106), and two three-port memory devices. A communication switch (108) within each node (100) connects it to a fast parallel hardware channel (70) through which all high density data arrives or leaves the node.

14 Claims, 4 Drawing Sheets

U.S. PATENT DOCUMENTS

| | | | |
|---|---|---|---|
| 4,975,913 | 12/1990 | Watanabe et al. | 370/112 |
| 4,989,202 | 1/1991 | Soto et al. | 370/13 |
| 4,990,985 | 2/1991 | Kamata | 357/24 |
| 4,992,933 | 2/1991 | Taylor | 364/200 |
| 5,005,151 | 4/1991 | Kurkowski | 364/900 |
| 5,014,189 | 5/1991 | Tamitani | 364/200 |
| 5,029,331 | 7/1991 | Heichler et al. | 371/43 |
| 5,051,982 | 9/1991 | Brown et al. | 370/85.2 |
| 5,056,006 | 10/1991 | Acharya et al. | 395/474 |
| 5,109,226 | 4/1992 | Mac Lean, Jr. et al. | 341/95 |
| 5,111,399 | 5/1992 | Armitage | 364/421 |
| 5,280,474 | 1/1994 | Nickolls et al. | 370/60 |
| 5,418,970 | 5/1995 | Gifford | 395/800 |

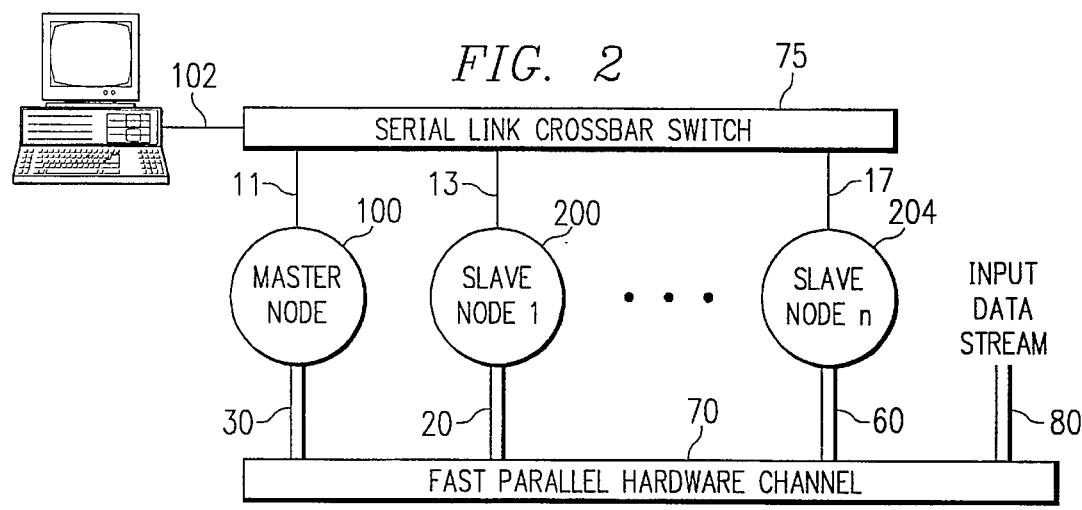
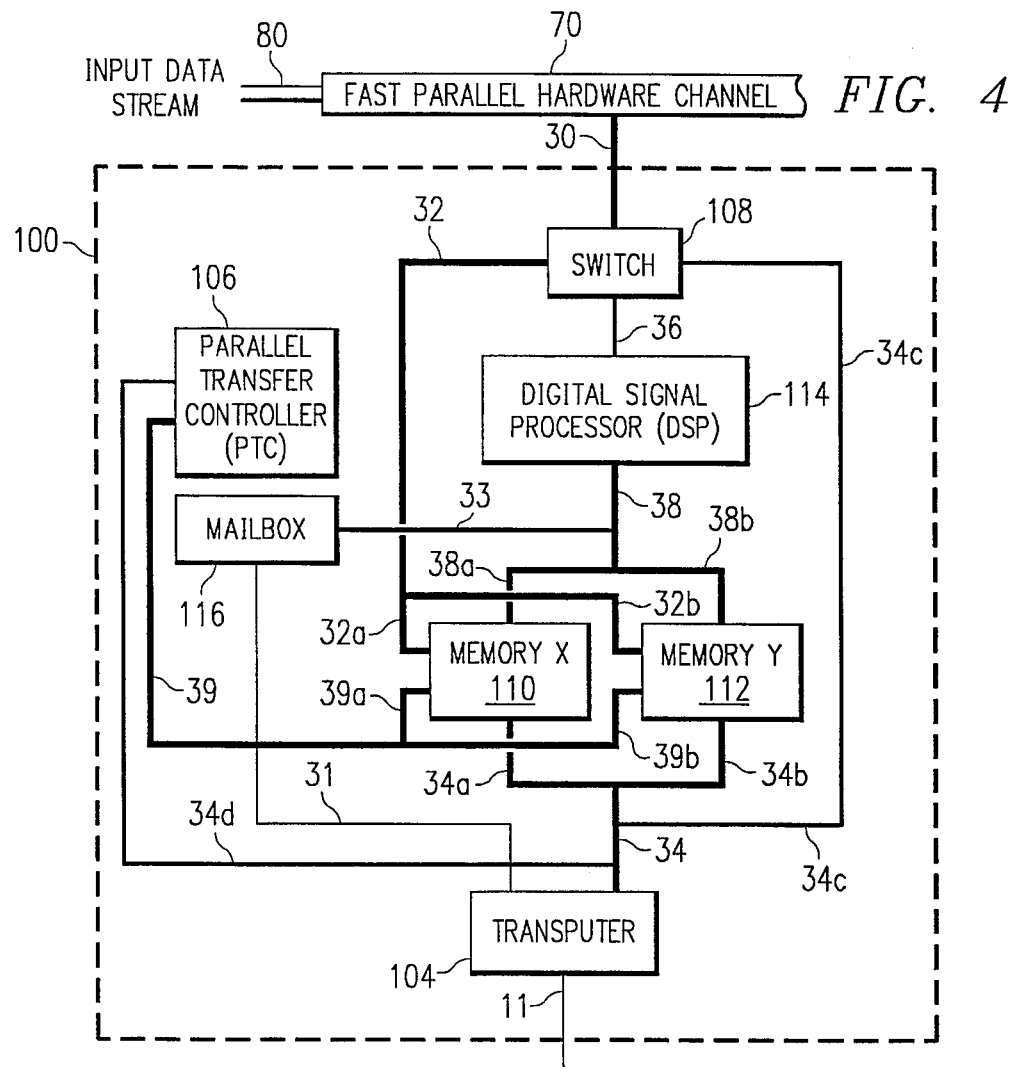

PARALLEL PROCESSING DATA NETWORK OF MASTER AND SLAVE TRANSPUTERS CONTROLLED BY A SERIAL CONTROL NETWORK

STATEMENT AS TO RIGHTS TO INVENTIONS MADE UNDER FEDERALLY-SPONSORED RESEARCH AND DEVELOPMENT

This invention was made with Government support under Contract No. DE-AC35-89ER40486 between Universities Research Association, Inc. and the Department of Energy. The Government has certain rights in this invention.

This is a continuation of application Ser. No. 07/856,622, filed Mar. 24, 1992, now abandoned.

TECHNICAL FIELD OF THE INVENTION

The present invention relates in general to parallel processing systems and in particular to the communication of commands and high density data transfer among the dynamically configurable topologies of the processing nodes of such systems.

BACKGROUND OF THE INVENTION

Large scientific data processing applications can often be partitioned such that they may be carried out by several concurrently operating (parallel) processors, each of which handles a different portion of the problem so as to reduce the total processing time required. In a concurrent parallel processing system, for a given topology, any node processor can be attributed the task of "master processor" for a given time or application. The master processor controls the distribution of tasks among the slave processors and monitors and directs their progress. The slave processors often share large volumes of data among themselves as required by the particular tasks assigned to each.

The master processor typically provides the primary user interface to the parallel processing system and as such may require rapid access to a large volume of data. These system level functional requirements in turn place the following requirements on the communication network serving the parallel processing system: (1) flexibility to support dynamic re-configuration and asynchronous communication; (2) wideband communication to support rapid transmission of high density data; and (3) real time communication of system commands and system status with reduced software transmission overhead. These requirements are independent of the parallel processing system configuration used (i.e., fixed, dynamic, tree, mesh, cubic, hypercubic) but do become increasingly critical as the system's configuration increases in complexity. Increased communication efficiency with respect to time has been a focus of the prior art.

Prior art solutions have taken a variety of approaches to improving data communication speed in the demanding parallel processing environment. The solutions have called for trade offs between speed, flexibility, the maximum number of nodes permitted, and cost. For example, Cowley U.S. Pat. No. 4,876,641 discloses a parallel processing network with a plurality of processors located on a plurality of chips in multiple rows and columns. The processors are interconnected with a first switching of logic means (multiplexer) on each chip which interconnects the processors in parallel data paths. The processor is also interconnected with a second switching logic means (multiplexer) external to the chips which connect selective rows and columns between chips in serial data paths.

The Cowley patent system involves communications between parallel processing elements in both parallel and serial data paths. The processing elements are envisioned as simple shift registers with the multiplexer switching between serial and parallel data paths; this is considerably different from the parallel transfer controller envisioned by the present invention. There is no apparent distinction made between the types of information flowing over serial and parallel paths. There is apparently no discussion of transmitting command messages over the serial links and data information over the parallel links.

Call U.S. Pat. No. 4,891,751 patent discloses a massively parallel processing system which includes a transputer interfacing with a processing node to other processing nodes. A separate peripheral processing network of peripheral processing nodes are also interconnected to transfer data back and forth. One network may interface with the other or may bypass the other network as desired. However, data is transferred by serial link transfers between nodes rather than on fast parallel channels.

Kneib U.S. Pat. No. 4,641,238 shows a network of parallel processing nodes communicating with each other over a serial bus. The nodes also communicate over a serial bus to a central global memory which feeds to a master processor. An arbiter controls which of the nodes is to be utilized in various computations required by the master processor. Kneib shows serial interconnection between the nodes. However they communicate by parallel only indirectly through the global memory under the control of master processor and arbiter. The local nodes do not determine the transmission of data over the parallel bus. Moreover, there is no distinction between transferring control commands on the serial bus and data on the parallel bus as in the present invention.

Therefore a need exists for an efficient communication solution to support a parallel processing network having a plurality of processing nodes. The present invention meets this need through an optimized transfer of data between processing nodes over a fast parallel channel in response to control commands being sent between processing nodes over serial links. The approach of the present invention facilitates efficient reconfiguration of parallel system topology, re-distribution of tasks among the nodes, and maintains maximum data transfer rates.

SUMMARY OF THE INVENTION

The present invention is a real-time high density data communication system designed to operate efficiently in a dynamically configurable, multi-processor parallel processing environment. In a concurrent parallel processing system, for any one given topology, any one processor node can be attributed the task of "master processor" for a given time or application. The invention utilizes a serial communication network to disseminate commands from the master processor to the slave processors, to effect communication protocol to control transmission of high density data among nodes, and to monitor the status of each slave processor. In a concurrent parallel processing system, for a given topology, any node processor can be attributed the task of "master processor" for a given time or application. The invention utilizes a parallel channel communication network in conjunction with two triple port memories at each processor node (master or slaves) in the system to efficiently transmit high density data for sustained or burst intervals without having to interleave communication control messages. The reduced processing and cost overhead of this invention is an improvement over general purpose communication schemes such as Scalable Coherent Interface (SCI) and High Performance Parallel Interface (HIPPI) which may also be used to provide a communication for parallel processing systems.

Each processor node preferably includes a transputer for the purpose of accomplishing the parallel processing task assigned to it within the parallel processing system and initializing and controlling all devices associated with that node. Each processor node preferably includes a digital signal processor for the purpose of compacting, filtering the data and implementing other mathematical algorithms. Each processor node also preferably includes a parallel transfer controller for the purpose of preparing its host node to send or receive parallel data in response to control commands received or sent over the serial communication link by the host transputer from or to other nodes.

In conjunction with the parallel transfer controller and the communication data switch, the transputer directs the flow of data traffic within the node and to or from the rest of the system. Each processor node also preferably includes two triple port memories, memory x and memory y, for the purpose of storing large volumes of data for transmission and supporting read/write access by the transputer, digital signal processor, and parallel transfer controller.

The transputer determines how memory X and memory Y should be allocated to meet the memory requirements of the node. Upon the transputer's command, the parallel transfer controller allocates memory X and memory Y resources such that they may be accessed by the transputer or digital signal processor (DSP) as required by the transaction or may send or receive data to or from the fast parallel hardware channel. The parallel transfer controller also monitors (counts number of words and keeps track of starting and ending addresses) traffic over the parallel data bus connecting the node to the fast parallel transfer channel.

The system of the present invention fulfills the requirements mentioned earlier for a parallel processing system of flexibility, wide band communication and real time transmission of the system commands and status. A particular characteristic of the invention is the very low software overhead time for starting and ending the transfer of data. This characteristic of the present invention is in contrast with a SCI (scalable coherent interface) system which is more suitable for connecting processing nodes for general purpose applications and which has the disadvantage of a high software protocol overhead time (25% of each transmission is devoted to communication protocol).

The system of the present invention is extremely fast because the parallel bus segments between the processors do not need any control lines (only clock and data lines are used) and need not have arbitration, since this functionality is provided by the processors communicating over the serial links. Moreover, because the serial and parallel communication networks are each-dedicated to the transmission of control information and data respectively, the software processing of transmitted data is further reduced. The system is structured around the concept of dedicated purpose networks and as a result there is less processing time required to parse and interpret each transmission.

If desired, a parallel processing system utilizing the approach of the present invention could interface with a SCI or a HIPPI network through the assignment of a processing node in the parallel processing system to provide that interface. Exchange of communication control commands among nodes over the serial link network is controlled by transputers using a simplified software protocol which anticipates transmission or receipt of such communication control commands. One is not prevented from using the parallel processing system on the serial network with all the features provided by conventional operating systems and languages, such as OCCAM (A trademark of INMOS Group of Companies). Upon direction by the active node's transputer, data is transmitted or received by the node under the control of a parallel transfer controller utilizing a simplified protocol which is essentially a hardware protocol.

In the preferred embodiment of the present invention the fast parallel channel is dedicated solely to the transfer of data so that the hardware protocol is minimized. Likewise, the serial links are dedicated solely to the transfer of control signals so that the software protocol is minimized. As a result, the total transfer time of the data, including starting and ending protocols is minimized so that data may be transferred at very high speeds between nodes. Thus, the system of the present invention is particularly useful for image processing and pattern recognition, speech recognition, measurement correlation of different instruments at different sites, large bandwidth data acquisition systems, data correlation for trigger decisions and data acquisition/ compression in high energy physics experiments.

The system is economical in that it can be implemented using standard highly advanced economical components such as commercially available processors, operating systems, higher order language compilers, serial links and cross bar switches. The system is also simple in that it can be implemented using only common digital circuits having counters and buffers, and it requires simple protocols with only one handshake to establish the necessary connections. Moreover, the command and control flow is completely separated from the data flow. The system is also versatile in that many different topologies can be realized by combining various processors and different supporting languages on a modular hardware structure. This advantage makes the invention easy to integrate with existing operating systems for parallel processing and makes possible the use of any of several conventional languages such as OCCAM, Parallel C, Pascal, and ADA.

BRIEF DESCRIPTION OF THE DRAWINGS

For a more complete understanding of the present invention, and for further details and advantages thereof, reference is now made to the following Detailed Description taken in conjunction with the accompanying drawings, in which:

FIG. 2 is a block diagram illustrating the application of a Parallel Data Transfer Network Controlled by a Dynamically ReConfigurable Serial Network to a dynamically configurable parallel processing system with one master and a plurality of slave nodes;

FIG. 4 is a block diagram illustrating the configuration of a typical processing node in an N-dimensional, dynamically configurable, parallel processing system applying the Parallel Data Transfer Network Controlled by a Dynamically Re-Configurable Serial Network.

DETAILED DESCRIPTION OF THE DRAWINGS

The present invention relates to a method and apparatus for implementing serial control of parallel data communication in a parallel processing system which overcomes many of the disadvantages found in the prior art. The present invention maximizes high density data communication speed and yet maintains the flexibility of dynamic reconfiguration of the parallel processing network topography.

Figure 1:
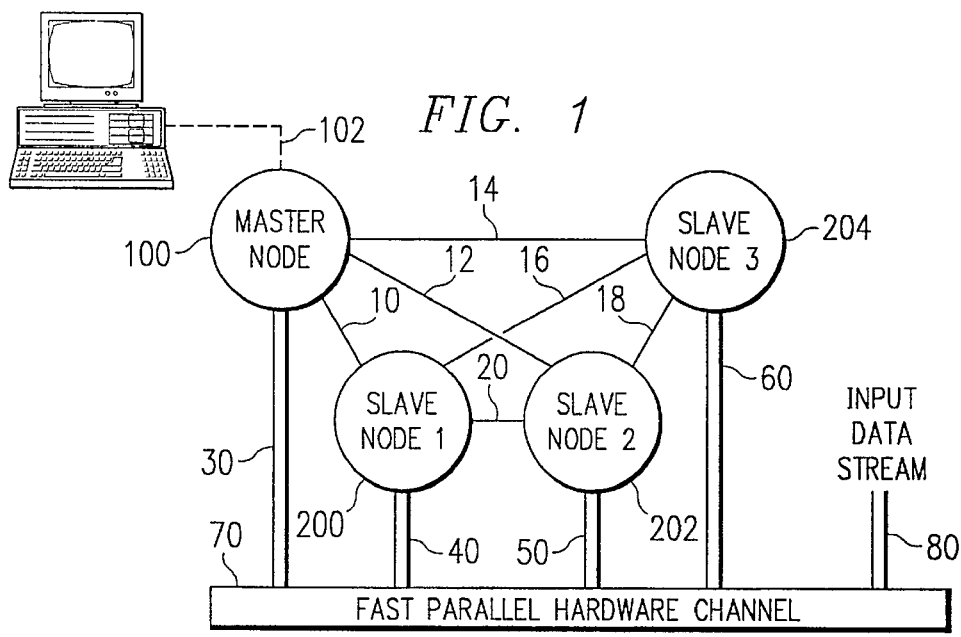
FIG. 1 is a block diagram illustrating the application of the present Parallel Data Transfer Network Controlled by a Serial Network to a fixed mesh parallel processing configuration consisting of a master processor node and three slave nodes.

FIG. 1 illustrates a typical multiple-instruction-multiple-data (MIMD) parallel processing system consisting of a first master processor node 100 and first, second and third slave processor nodes 200, 202, 204 in a fixed mesh configuration. This configuration utilizes the novel approach of serially controlled parallel data transfer among the nodes. Each node in the preferred embodiment can be comprised of a transpurer, a parallel transfer controller, a digital signal processor and other elements as described in detail below in association with FIGS. 3 and 4.

The master node 100 may provide the primary human user interface 102 and thus the seat of user control for the entire parallel processing system. The primary user interface 102 in association with the master node 100 allows the human user to initiate system operation, direct testing, monitor system operation, display processing results and any of various other typical user interface functions. The user interface 102 requires the use of a serial link to the transputer and in a fixed parallel processing configuration would reduce the number of processing nodes directly connected to the master processor by one. For this reason the user interface 102, which is optional, is connected with a dashed line.

The master node 100 is directly connected with each of the first, second, and third slave nodes 200, 202, 204 by full duplex serial links 10, 12, 14 respectively, capable of transmitting at a bi-directional rate of 2.4 Mbyte/sec. The master node 100 uses these serial links 10, 12, 14 to assign processing tasks among the first, second and third slave nodes 200, 202, 204 and to monitor the state of each slave node at all times. All nodes in the system utilize the serial links 10, 12, 14, 16, 18, 20 interconnecting them to control the communication of shared data as necessary to perform the tasks assigned to each node. The serial links 10, 12, 14, 16, 18, 20 handle all the communication protocol relating to parallel data transmission traffic over the fast parallel hardware channel 70 and the parallel data buses 30, 40, 50, 60 using existing software supported protocols within higher order languages such as OCCAM, Parallel C, ADA, and Pascal.

One preferred embodiment of the fast parallel hardware channel 70 utilizes a flat/ribbon cable in a multi-drop configuration consisting of three-state bus lines, with a connector for each node which is in turn coupled with a 32-bit parallel three-state bus 30, 40, 50, 60 which is capable of transmitting at a rate of 150 Mbyte/sec. Three state drivers are enabled such that one parallel interface transmits data and any number of the remaining nodes within the parallel processing system receive the data.

For illustrative purposes, assume that the parallel processing system in FIG. 1 is in the middle of a continuing operation. The first slave node 200 might send a communication control message through the interconnecting serial link 16 to the third slave node 204 letting it know that it is "READY TO TRANSMIT" data over the parallel network. Once third slave node 204 returns a "READY TO RECEIVE" control message through serial link 16 to first slave node 200, the data is sent from first slave node 200 through parallel data bus 40, fast parallel hardware channel 70, and parallel data bus 60 to third slave node 204 for further processing. At the same time first slave node 200 would also send a status message through the interconnecting serial link 10 to the master node 100 letting the master node 100 know that it had finished its assigned task and that the intermediate results were being sent to third slave node 204 for further processing.

One preferred embodiment of this invention provides for the assumption that the assignment, synchronization and sequencing of processes by the master node 100 is sufficient to dispense with full communication handshake protocol making "ACKNOWLEDGEMENT" messages unnecessary. Serial link synchronization is achieved automatically through the use of the four transputer serial links in a loose coupling scheme. Synchronization of parallel data communication is achieved through transferring large blocks of data using the selectable 110, 112 triple ported memories in a tight-coupling scheme (shown in FIG. 3).

Continuing with the illustrative example, assuming that processing by third slave node 204 is the last processing step at a slave node in this tasking sequence, the data resulting from the processing at third slave node 204 might then be sent to the master node 100 for storage, final processing, or display. To transmit this resulting data, a communication sequence analogous to the one previously described would take place. Third slave node 204 sends a "READY TO TRANSMIT" communication control message through the interconnecting serial link 14 to the master node 100 which in turn sends a "READY TO RECEIVE" communication control message through the interconnecting serial link 14 to third slave node 204. Third slave node 204 then sends the data resulting from its previous processing to the master node 100 through parallel data bus 60, fast parallel hardware channel 70 and, parallel data bus 30. Data may be sent to more than one processing node at the same time by sending communication control messages over the serial link to the various destination nodes which upon receipt will prepare to receive the parallel data transmission.

An input data stream 80 is shown in FIG. 1 as a parallel data stream feeding into the fast parallel hardware channel for receipt by all nodes whose assigned processing task calls for processing of the raw input data stream or for receipt by the corresponding P node. Multiple input data streams may feed the parallel processing system as shown in more detail in FIG. 5. As an example, a parallel processing system, which analyzes sensor data reporting the incidence of elementary particles of varying weight in a nuclear reaction, may assign parallel processing tasks for the recognition, counting and occurrence profile determination of particular particle types to particular nodes in the system which would operate simultaneously on the same input data stream. It is equally possible to configure the parallel processing system in such a way that each node in the parallel processing system has a distinct input data stream from a suite of sensors (or other data source) dedicated to that particular node in the parallel processing system.

The system illustrated in FIG. 1 meets the challenge of optimal communication speed through the application of serial control of parallel communication and is effective in systems comprised of a relatively small number of nodes such that having dedicated direct serial links between the nodes does not impose a prohibitive cost burden in terms of cabling, maintenance, weight, nor space. However, to meet the demands of more complex applications, a very large number of processing nodes may be necessary in the parallel processing network (eg., neural network applications). Further to utilize such a system to its ultimate capacity, it is essential to have the capability to dynamically change the task distribution and topography of the parallel processing system as required by changes in mode of operation, for instance shifts in tasking to achieve load balancing in fail-over-recovery operations.

The parallel processing system illustrated in FIG. 2 maintains the enhanced high density data communication speed achieved through serially controlled parallel data transmissions, as illustrated in FIG. 1, while incorporating a serial link crossbar switch 75 to provide the capability of dynamic reconfiguration to the parallel processing system (eg., from a tree to a mesh configuration). The presence of a serial link crossbar switch 75 coupled with the serial links 11, 13, 17 respectively interconnecting each processing node 100, 200, 204 in the parallel processing system accelerates the exchange of communication control messages necessary to set up parallel data transfers. This acceleration is due to the fact that logically as well as physically all nodes are interconnected as if they were adjacent regardless of the number of total nodes in the system. The serial link crossbar switch 75 in connection with the serial links 11, 13, 17 replace the dedicated direct serial links 10, 12, 14, 16, 18, 20 shown in FIG. 1 to effect the same interconnectivity between the nodes. Further, user interface 103 may now be added to the parallel processing system without reducing the number of slave nodes logically directly connected to the master node.

The parallel processing system illustrated in FIG. 2 applies the novel approach of controlling parallel data communication through the use of serial links in conjunction with a serial crossbar switch to effect a dynamically re-configurable parallel processing system which supports high speed transmission of high density data over a parallel data channel without regard to the total number of nodes in the parallel processing system.

Figure 3:
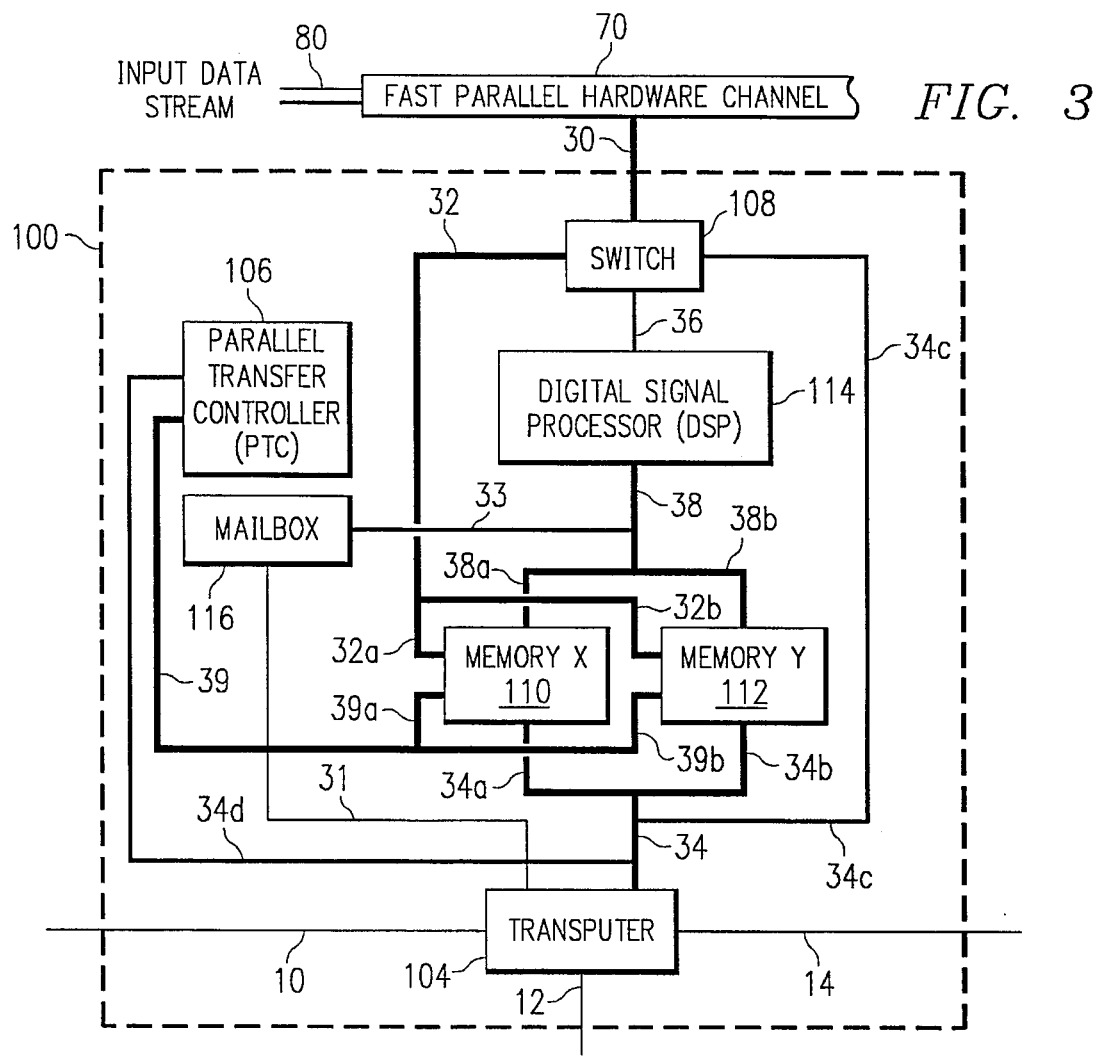
FIG. 3 is a block diagram illustrating the configuration of a typical processing node in a fixed parallel processing system applying the Parallel Data Transfer Network Controlled by a Serial Network.

FIG. 3 is a functional block diagram illustrating the internal configuration of the master node 100 or slave nodes 200, 202 and 204 of FIG. 1, in another preferred embodiment of this invention. The salient difference between a master node and a slave node is not in its hardware configuration but rather in its software determined function within the parallel processing network. The node illustrated in FIG. 3 is representative of any node of a parallel processing system structured in a fixed tree or mesh configuration, and although it will be discussed here as if it were the master node 100, the discussion of its internal configuration, communication interfaces and functional description of its constituent elements is typical of both master and slave nodes.

An overview of the elements of FIG. 3 and their operation will first be given, followed by a more detailed discussion of the preferred embodiment. Node 100 includes a transputer 104 connected to a communication switch 108 via parallel data buses 34 and 34c, a digital signal processor 114 via parallel data buses 31 and 33 through a mailbox 116, two triple port memories 110 and 112 via parallel data buses 34, 34a and 34b, and a parallel transfer controller 106 via parallel data buses 34 and 34d. Transputer 104 is also connected to serial links 10, 12 and 14 which connect to other transputers in adjacent nodes 200, 202, 204.

Transputer 104 is a conventional microcomputer having on a single chip a processor, a memory and communication links for connection to other transputers.

Digital signal processor 114 (DSP) is a conventional special-purpose computer particularly adapted for high-speed application of mathematical algorithms to data acquired through direct memory access (DMA). Typical functions implemented by the DSP using algorithms are filtering, pattern recognition, data compression/decompression, track finding, peak finding, parallel matching of incoming data to a stored look-up table, and so forth.

Communication switch 108 is preferably a conventional device that can be programmed or instructed to direct the flow of data to and from the devices to which the switch is connected. Triple ported memories 110 and 112 are data storage devices capable of reading or writing data from or to storage and capable of hardware connection to three devices.

Parallel transfer controller 106 is a device which is capable of monitoring parallel data communication to and from its host node and carrying out instructions issued by the transputer to prepare its node for receiving or transmitting parallel data.

The parallel transfer controller 106 is a simplified version of a direct memory access (DMA) controller. The parallel transfer controller 106 prepares its host node 100, 200, 202, 204 to send or receive parallel data in response to instructions received from its host transputer 104. The transputer 104 allocates memory x and memory y resources such that they may be accessed by the transputer 104, digital signal processor 114 or parallel data bus 32 as required by the transaction or to send or receive data to or from the fast parallel hardware channel 70. The parallel transfer controller generates the memory address and initializes the parallel data transfer.

An overview of the operation of the elements shown in FIGS. 1 and 3 is now given. The transputers 104 of nodes 100, 200, 202 and 204 exchange software communication protocol messages such as "READY TO SEND" and "READY TO RECEIVE" commands directly through serial links 10–20. The transfer of data is carried out from memories 110, 112 over the fast parallel hardware channels 70.

The flow of data into a node is from the fast parallel hardware channel 70 through the communication switch 108 and into the assigned memory 110, 112 for subsequent access by the transputer 104 or pre-processing by the digital signal processor and then to the transputer. The parallel transfer controller 106 sets and resets memory addresses such that the memory may receive the incoming data and then be accessible to the transputer or digital signal processor as required. The parallel transfer controller generates the address to the memory, monitors the data transfer, keeping count in real-time, of the number of bytes transferred and the start and end storage locations in the assigned memory.

The processing of data which is to flow out of a node is done by the transputer 104 and the digital signal processor 114 both acting on the data in memory 110, 112. The data in the memory 110, 112 flows out of the node through the communication data switch 108 to the fast parallel hardware channel 70 to its final destination at one or more other nodes. Before transfer of data takes place, the transputer 104 assigns the connections between the memory, parallel channel controller and digital signal processor. Then the parallel transfer controller 106 sets and resets memory addresses. Then that memory is reassigned to the digital signal processor 114 so that it may prepare the data for transmission. Next, the memory containing the data to be transmitted is assigned to the parallel data port connected to the communication switch 108. The memory executes a read command and the data it contains is transferred to the fast parallel hardware channel 70 via the communication switch 108. The parallel transfer controller 106 generates the address to the memory, monitors the data transfer, keeping count in realtime of the number of bytes transferred and the start and end memory locations of the data being sent out of the node.

Looking now at the functional block diagram in FIG. 3 in more detail, the communication switch 108 within node 100 is connected to the fast parallel hardware channel 70 through a 32-bit parallel bus 30. It is through this parallel communication interface that all high density data arrives or leaves the node, whether transmitted in bursts or sustained transmission intervals. Full duplex, two-bit serial communication links 10, 12, 14 directly carry the communication control commands to and from nodes adjacent to node 100, as explained above.

The digital signal processor 114 is coupled to the transputer 104 to increase the computing capability by filtering, pattern recognition, compressing and expanding the data. The role of the DSP 114 can also be done by other general purpose microprocessors, such as RISC general purpose microprocessors or equivalents, in a tightly-coupled communication scheme with the transputer.

The transputer 104 is responsible for initialization of the fast parallel hardware channel connector at its node as a transmitter or receiver. The transputer 104 accomplishes this by initializing the parallel transfer controller 106 parameters via 32-bit parallel data buses 34 and 34d. The transputer 104 controls access to the fast parallel hardware channel by selecting the receiving internal device which can be the transputer 104, digital signal processor 114, or triple ported memories 110, 112. The transputer then has the communication switch 108 direct the flow to that device. The transputer 104 communicates with the communication switch 108 by writing a bit map control word to a register shared by the transputer 104 and the switch 108. The transputer 104 notifies the parallel transfer controller 106 of the pending transmission so that if required it can re-set the address of the triple port memory 110, 112 designated by the transputer 104 to prepare that memory to receive or transmit the data through memory write or read operations respectively.

Control of the parallel transfer controller 106 by the transputer 104 is effected by writing a bit map control word to a 32-bit shared register. Communication between the transputer 104 and the parallel transfer controller 106 or communication switch 108 takes approximately 100 nanoseconds. The time for a transputer to send a control command to another transputer telling it to prepare to receive data and where to put it is typically only about 850 nanoseconds. Thus, the overall setup time to start and end the startup protocol, called "software overhead time" is less than one microsecond. This is considerably faster than other protocols for parallel processing systems and yet provides similar flexibility.

The parallel transfer controller (PTC) 106 sets the addresses of the triple ported memories 110, 112 and counts the number of words being transmitted over the parallel data bus 32 and, keeps track of the starting storage address. If the data to be transmitted originates from the node 100, the transputer 104 sends notice of its intent to transmit to the PTC by sending it a 32-bit map control word over the shared register containing the starting address, word count, and node selection(s). The PTC 106, via 16 bit parallel data bus 39, in turn resets the address of the triple memory 110 or 112 which contains the data to be transmitted to link that memory to the parallel data bus 32(a or b) and 32. The transputer 104 then sets up the parallel data communication control with the receiving node(s) over the serial link(s). For the case of a message coming into the node 100 from an adjacent node upon receipt of a "READY TO TRANSMIT" communication control message through the serial network, the transputer 104 notifies the PTC 106 to prepare for incoming parallel data.

The transputer 104 communicates with its digital signal processor (DSP) 114 in three ways. First, communication may pass through 2-bit serial link 31 to the DSP input buffer 116 also called a mailbox. The presence of data in the input buffer 116 of the DSP 114 generates an interrupt which is sent through the 8-bit parallel data bus 33 and parallel data bus 38 to the DSP 114. Second, communication can occur through an array of data written to one of the triple-port memories 110, 112 via-32-bit parallel bus 34, then accessed by the DSP 114 via 38. Third, communication may pass through the 32-bit parallel bus 34, then the 16-bit parallel bus 34c, through the communication switch 108, then 16-bit parallel bus 36.

Although a digital signal processor is not an essential element of this invention, it does enhance the overall capabilities of the processing node by reducing some of the processing load of the transputer and reducing the volume of data transmitted over the fast parallel data channel 70 by compacting the data and on receipt expanding the data.

The third method of communication between the transputer 104 and the DSP 114 is used to download software to the DSP and initialize the DSP. The DSP 114 is capable of processing incoming data 80, coming through the communication switch 108, directly over a 16-bit parallel data bus 36. The DSP 114 would then store the processed (expanded, filtered) data directly on triple port memory 110 or 112 for subsequent access by the transputer 104. However, transmission over a 16-bit parallel data bus 36 is slower than transmission over the 32-bit parallel bus 32 and unless there is a very low volume of data or time is not critical the path through the parallel bus 32 directly to memory 110 or 112 is preferred.

The typical node internal configuration functional block diagram in FIG. 4 is analogous to that of FIG. 3 except that it incorporates a serial link crossbar switch 75 to support the capability of dynamic reconfiguration of the parallel processing system as discussed in relation to FIG. 2. Only one 2-bit serial link 11 is required to connect the transputer 104 to the serial communication network. The serial link input ports on the transputer 104 have pull-down resistors to ensure that they are disabled when they are not connected.

The transputer 104 in the preferred embodiment is an INMOS 25 MHz T800 transputer although an INMOS T9000 or equivalent may also be used. The preferred embodiment of the memories 110 and 112 is a 32 Kbyte×8, 10 nanosecond memory by Motorola MCM 6706-J10. The digital signal processor selected for the preferred embodiment is a DSP32C manufactured by AT & T.

Figure 5:
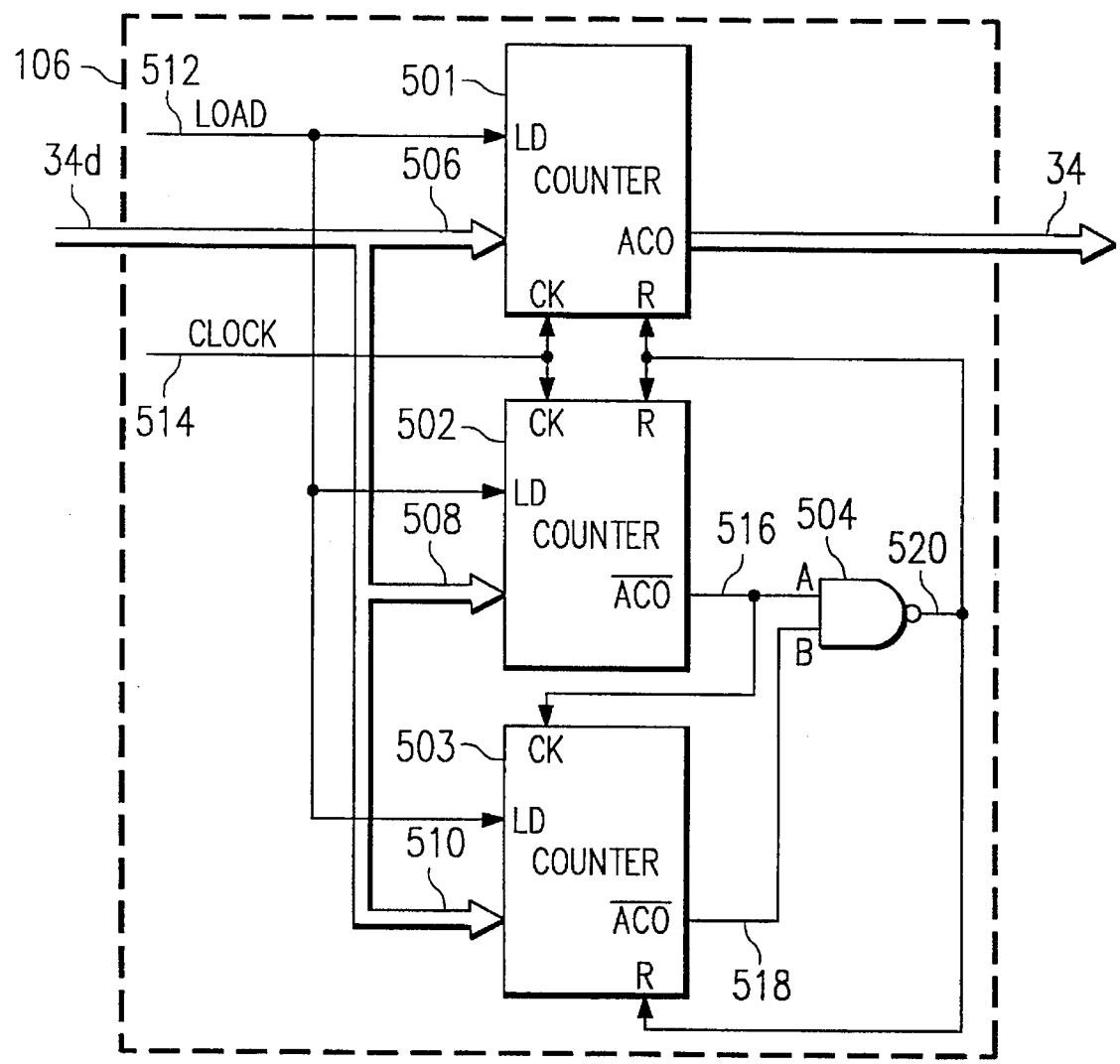
FIG. 5 is a block diagram illustrating a preferred embodiment of the parallel transfer controller.

FIG 5 shows a preferred implementation for the parallel transfer controller. The parallel transfer controller consists of three counters and a NAND gate.

First counter 501 increments the initial read or write address of memory x or y issued by the transputer, via parallel data buses 34d and 506 upon each clock pulse input 514 until the transmission is completed. The memory address thus generated sent via 39 and 39a or 39b is used to set the memory 110, 112 read or write location. In one preferred embodiment this counting function may be implemented utilizing two Texas Instruments 74L697 counters in cascade configuration.

Second counter 502 which is a circular counter can be preloaded by the transputer via parallel data buses 34b and 508 with any initial value ranging from 0–256. This 256 counter circular counter 502 decrements the count starting until the end of the data transmission. The borrow out signal 516 is coupled to the NAND gate 504 input A and to the counter 503 clock input. In one preferred embodiment this counting function may be implemented utilizing one Texas Instrument 74LS697 counter.

Third counter 503 decrements the initial value set by the transputer via parallel data buses 34d and 508, once for each data packet transmitted. The borrow out signal is coupled to the NAND gate input. In one preferred embodiment this counting function may be implemented utilizing two Texas Instrument 74LS193 counters in cascade configuration.

The NAND gate 504 compares the borrow out signals from the second and third counters to determine the end of the entire transmission. When the value of both borrow out signals are "1" then the transmission is complete and the output of the NAND gate 504 becomes "0" and this value is fed back via 520 to reset counters 501, 502 and 503.

Figure 6:
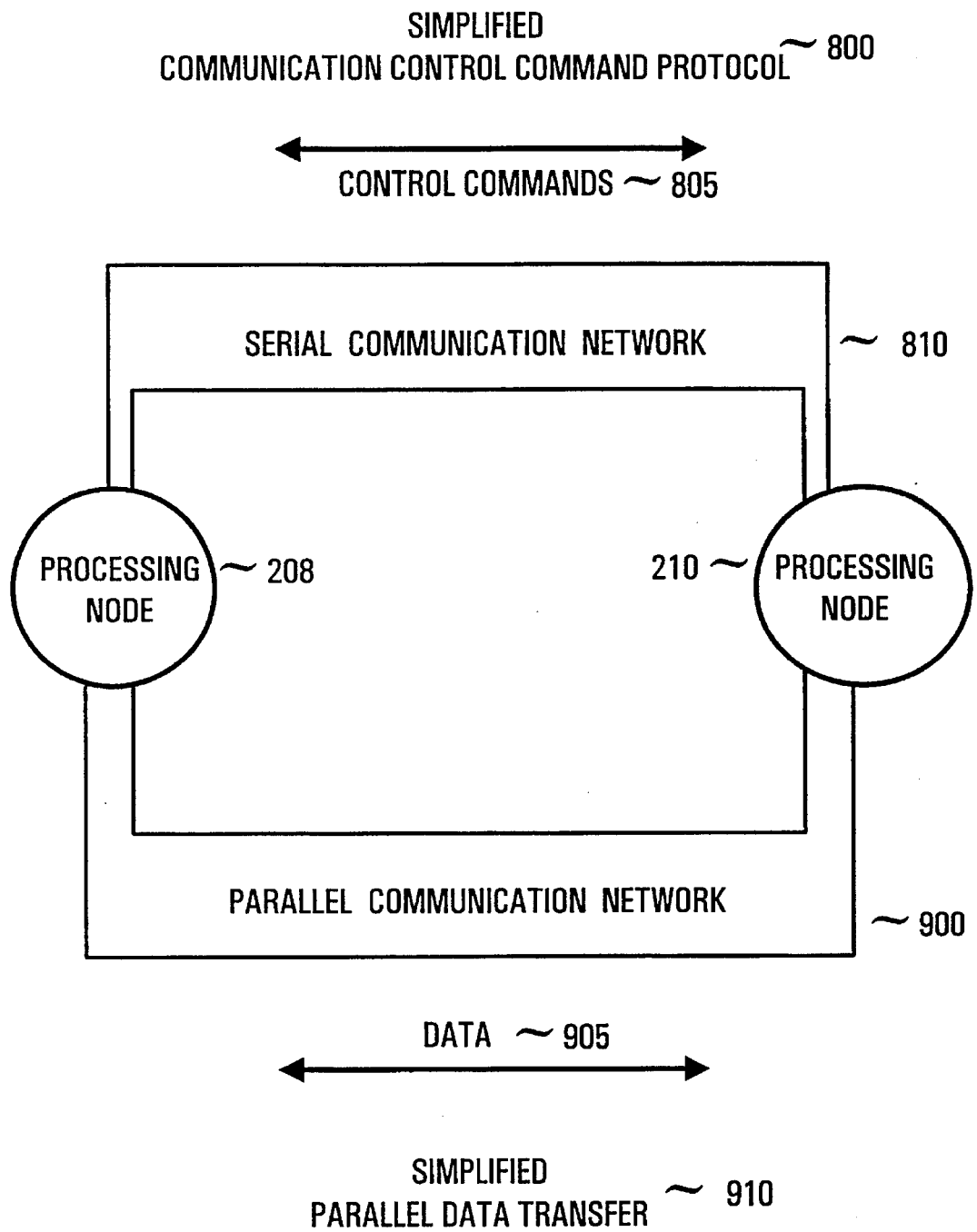
FIG. 6 is a block diagram illustrating the transmission of communication control commands using the Simplified Communication Control Command Protocol over the Serial Communication Network to control the transmission of data between processing nodes using the Simplified Parallel Data Transfer Protocol over the Parallel Communication Network.

FIG. 6 illustrates the transmission of communication control commands 805 using a simplified communication control command protocol 800 over the serial communication network 810 to control the transmission of data 905 between processing nodes 208, 210 using a simplified parallel data transfer protocol 900 over the parallel communication network 910. These elements, previously discussed throughout this Specification, are recapped below for the convenience of the reader.

The Summary of the Invention introduced the concept of control commands transmitted over a dedicated serial communication network to control transmission of parallel data over a dedicated parallel communication network. The invention utilizes a serial communication network to disseminate commands from the master processor to the slave processors, to control transmission of high density data among nodes, and to monitor the status of each slave processor. The invention utilizes a parallel channel communication network to efficiently transmit high density data for sustained or burst intervals without having to interleave communication control messages.

Because the serial and parallel communication networks are each dedicated to the transmission of control information and data respectively, the software processing of transmitted data is reduced. The system is structured around the concept of dedicated purpose networks and as a result there is less processing time required to parse and interpret each transmission. Thus both serial and parallel communication protocols are simplified.

The serial links 10 through 20 which may be coupled to the serial link crossbar switch 75 as illustrated in FIGS. 3 and 4, collectively known as the serial communication network 810, are used by all processing nodes in the system to control the communication control relating to parallel data transmission traffic over the fast parallel hardware channel 70 and the parallel data buses 30, 40, 50, 60 collectively known as the parallel communication network 910.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the scope of the invention.

I claim:

1. A parallel data transfer network for the transfer of data controlled by a serial communication network to effect direct point to point communication between processing nodes arranged in an n-dimensional array, independent of physical or logical location of the processing nodes within the array, said parallel data transfer network comprising:

(a) a plurality of processing nodes, each adapted for processing, sending and receiving data and commands; one of said nodes acting as a master node and at least one of said nodes acting as a slave node; each processing node further comprising a transputer connected to (i) at least one serial link for serial transmission of commands to and from the processing node, (ii) at least one memory for retaining data being transferred to and from the processing node, and (iii) a switch connecting the at least one memory, through at least one parallel data bus, to a hardware parallel channel for transmission of data to and from the processing node;

(b) a plurality of serial links connecting at least two of said processing nodes for the serial transmission of commands between said at least two processing nodes;

(c) a parallel hardware channel connected to said processing nodes by a plurality of parallel data buses for the transmission of data between said processing nodes in response to the commands serially transmitted over the serial links; and (d) a plurality of parallel data buses, each parallel data bus connecting one of said processing nodes to the parallel hardware channel.

2. The network of claim 1 wherein said nodes each further comprise a parallel transfer controller coupled between the at least one memory and the transputer for controlling the flow of data in and out of the at least one memory to and from the parallel hardware channel and to and from the transputer.

3. The network of claim 1 wherein said processing nodes each further comprise a digital signal processor coupled between the at least one memory, the transputer, and the parallel hardware channel for processing the data in the at least one memory prior to transmitting the data on the parallel hardware channel and for processing the data in the at least one memory after receiving it from the parallel hardware channel.

4. The network of claim 1 wherein the serial links of at least part of said plurality of processing nodes are connected by a serial link crossbar switch to effect direct point to point serial communication of parallel data transmission control commands between processing nodes, arranged in an n-dimensional array, independent of physical or logical location of the processing nodes within the parallel processing array.

5. A parallel processing system comprising:

(a) a plurality of processing nodes, each adapted for processing, sending and receiving data and commands; at least one of said processing nodes acting as a master node and at least one of said processing nodes acting as a slave node; each processing node further comprising a transputer connected to (i) at least one serial link for serial transmission of commands to and from the processing node, (ii) at least one memory for retaining data being transferred to and from the processing node, and (iii) a switch connecting the at least one memory, through at least one parallel data bus, to a hardware parallel channel for transmission of data to and from the processing node;

(b) a plurality of serial links connecting at least two of said processing nodes for the serial transmission of commands between said at least two processing nodes;

(c) a parallel hardware channel connected to said processing nodes by a plurality of parallel data buses for the transmission of data between said processing nodes under the control of the commands serially transmitted over the serial links; and (d) a plurality of parallel data buses, each parallel data bus connecting one of said processing nodes to the parallel hardware channel.

6. The system of claim 5 further comprising a parallel transfer controller coupled between the processing node and the parallel channel for controlling the transfer of data over the parallel channel.

7. The system of claim 6 wherein (a) the plurality of serial links is dedicated solely to the serial transfer of control commands between the processing nodes and (b) the parallel channel is dedicated solely to the transfer of data so that the total time required to send control signals and to transfer data is minimized.

8. The system of claim 7 wherein the transfer of control commands is effected using a software protocol simplified to process only control commands.

9. The system of claim 7 wherein the transfer of data is effected using a protocol simplified to transmit and receive only data.

10. The system of claim 6 wherein each of the processing nodes comprises a means for applying pattern recognition to the data.

11. The system of claim 5 wherein each of the processing nodes each comprises a transputer.

12. The system of claim 5 wherein each of the processing nodes comprises a means for compacting and expanding the data.

13. The system of claim 5 wherein each of the processing nodes comprises a means for filtering and pattern recognition of the data.

14. A communication network in the parallel processing system of claim 5 comprising: a parallel network for parallel transfer of data controlled by commands serially transmitted on a serial network to effect direct point to point communication between at least two processing nodes of the parallel processing system, arranged in an n-dimensional array, independent of physical or logical location of the processing nodes within the array.

* * * * *